United States Patent [19]

Hewitt

[11] Patent Number: 5,095,308
[45] Date of Patent: Mar. 10, 1992

[54] TRANSCEIVER WITH BATTERY SAVER AND METHOD OF USING SAME

[75] Inventor: Robert M. Hewitt, Fort Lauderdale, Fla.

[73] Assignee: Southern Marine Research, Inc., Miami, Fla.

[21] Appl. No.: 462,715

[22] Filed: Jan. 9, 1990

[51] Int. Cl.$^5$ ............................................. H04B 1/40
[52] U.S. Cl. ........................... 340/825.44; 340/636; 455/343; 324/433
[58] Field of Search ............... 340/825.44, 636, 661; 455/343; 324/433

[56] References Cited

U.S. PATENT DOCUMENTS

| | | | |
|---|---|---|---|
| 3,769,593 | 10/1973 | Williams | 340/825.44 |
| 3,877,001 | 4/1975 | Bogut et al. | 340/636 |
| 4,244,050 | 1/1981 | Weber et al. | 371/66 |
| 4,342,953 | 8/1982 | Collins | 320/13 |
| 4,365,241 | 12/1982 | Morishita | 340/636 |
| 4,493,001 | 11/1985 | Sheldrake | 361/92 |
| 4,509,102 | 4/1985 | Ayer | 361/92 |
| 4,509,201 | 4/1985 | Sekigawa et al. | 455/73 |
| 4,517,517 | 5/1985 | Kinney | 324/433 |
| 4,523,332 | 6/1985 | Mori | 340/825.44 |
| 4,544,910 | 10/1985 | Hoberman | 340/333 |
| 4,547,770 | 10/1985 | Suzuki et al. | 340/636 |
| 4,660,027 | 4/1987 | Davis | 340/636 |
| 4,679,224 | 7/1987 | Kawasaki et al. | 455/343 |
| 4,755,816 | 7/1988 | DeLuca | 340/8235.44 |

Primary Examiner—Donald J. Yusko
Assistant Examiner—Michael Horabik

[57] ABSTRACT

A portable transceiver has a battery saving feature which includes a timer, circuit which automatically cuts off the power supply to the receiver and transmitter for relatively long intervals and periodically turns on the power supply for relatively short intervals to check for transmission or receiver signals. If such signals are detected, the power supply continues to supply powers to the receiver and transmitter for the duration of the signals and for a short period thereafter. The transceiver also includes a batter voltage detection circuit which will cut off the battery power supply if the battery has discharge to a predetermined level, and which can be overridden in any emergency. The power supply is conveniently controlled by a pass device which must receive "operate" signals from both the timer circuit and the battery voltage detection circuit.

19 Claims, 3 Drawing Sheets

TRANSCEIVER WITH BATTERY SAVER AND METHOD OF USING SAME

BACKGROUND OF THE INVENTION

The present invention relates to transceivers and, more particularly, to battery powered transceivers with battery monitoring circuits.

As used herein, "transceiver" includes radiotelephones and cordless telephones.

The increasing use of rechargeable batteries in electronic and electromechanical equipment has stimulated the development of methods of preventing such batteries from being excessively discharged. The importance of this precaution stems from a number of factors related to battery life and rechargeability. The major factors are the irreversible, deleterious changes that take place within most batteries when they are deeply discharged, changes which not only prevent the battery from being subsequently recharged to its full ampere-hour capacity, but also eventually lead to battery failure as a result of repeated deep discharges.

An additional factor is the increasingly steep decline in battery voltage and the sharp rise in internal battery resistance as a battery approaches a condition of deep discharge. This resistance becomes an increasing portion of the dissipative, parasitic load, and a battery so abused rapidly loses its ability to maintain its terminal voltage under even a modest load. A further factor is the disproportionate lengthening of the time required for recharge of such batteries; relatively brief periods of use when the battery is approaching a deeply discharged condition may add hours to the time needed for recharge. Unfortunately, a battery which cannot be recharged overnight, and which requires up to 24 hours to recharge, will seldom be kept charging for the period necessary to obtain a full charge. More often, the battery will be removed from the charger and will be put into service though only partially recharged, and this can result in a memory factor limiting the amount of charge which the battery will subsequently take.

A variety of methods have been devised to monitor the terminal voltage of rechargeable batteries in order to sense when they are approaching deep discharge, and, along with control circuitry, to limit battery drain or even completely disconnect the load from the battery whenever the monitored voltage is sensed to have fallen below a desired threshold voltage.

The focus of most of these methods is an economic concern to prevent the battery from being damaged to the point where recharge is impossible and the battery must be replaced. In some instances, another concern is to minimize the inconvenience of an interruption in service. The prior art has not recognized the impact of inability to make use of equipment under circumstances when the failed or deeply discharged battery imperils the safety or even the survival of the user and others.

Such circumstances are frequently encountered in marine, police and fire applications. On small craft operating offshore, the only means of communication may be a hand-held radiotelephone or transceiver operating on a rechargeable battery. Radiotelephones used on such small craft serve several vital functions aside from that of ordinary communication, one of the major functions being to monitor the Coast Guard emergency channel (VHF Channel 16), since it is on that channel that safety messages, small-craft warnings and distress calls are broadcast, as well as initial hailing calls are received. Another major function is to permit the transmission of requests for emergency assistance on that channel, since it is monitored by the Coast Guard as well as by other craft which may be nearby and able to assist.

The rapidity of weather changes offshore is well known; the transition of the weather from light breezes to a dangerous, if short-lived squall, may occur within a period of half an hour or less. Therefore, small craft operators typically keep their radiotelephone receivers on and tuned to the emergency channel to hear any small-craft warnings, distress calls or other weather alerts. A substantial portion of the battery power is generally consumed in this manner, and a further drain is the power drawn by the transmitter during operation.

Engine failure or other malfunction is another common occurence with small craft which can deprive them of the headway needed for steering and put them in danger of capsizing as weather worsens. At such times sufficient battery power for the broadcast of requests for emergency assistance may constitute the margin between life and death. Clearly the power consumed in monitoring the emergency and other channels may, in such circumstances, place in jeopardy the adequacy of battery power needed for emergency transmissions.

It is therefore apparent that the monitoring for distress calls and warnings which is essential to safety offshore may be the cause of serious depletion of battery power, posing the danger of communications cutoff. Thus, paradoxically monitoring for safety broadcasts may ultimately threaten the safety of the vessel's occupants. When this situation is aggravated by having a battery which, because of earlier deep discharges, has not or cannot be fully recharged, the danger is sharply increased.

It is an object of the present invention to provide a novel battery-powered radiotelephone having both a battery-saver feature to prevent deep discharge and a battery power conservation feature to reduce the power consumption during channel monitoring and the time for recharging.

It is also an object of the present invention to provide a radiotelephone in which such features are automatically operative so that the benefits are not dependent upon the actions or operating procedures of the user.

Another object is to provide such a radiotelephone in which such features are provided relatively economically by components which are relatively simple and long lived.

SUMMARY OF THE INVENTION

It has now been found that the foregoing and related objects may be readily attained in a transceiver which has a rechargeable battery, a transmitter, and a receiver. Switch means is connected between the battery and the transmitter and receiver, and it is operated between "on" and "off" conditions by switch actuating means. Circuit means connects the battery to the transmitter and receiver through the switch means.

A timer circuit is connected to the receiver and transmitter, and it is operative to transmit an actuation signal to the switch actuating means upon receipt of a signal on the receiver or during operation of the transmitter. It is operative to disable the switch actuating means and thereby to maintain the switch means in an "off" condition during other periods to cut off power supply to the receiver and transmitter. This disabling of the power supply is periodically interrupted for short intervals to provide power to the receiver and transmitter for such short intervals. If an enabling signal is received by the receiver, or the transmitter is operated, during such intervals, the timer circuit enables continued power supply through the switch means. Battery voltage detection means is also connected to the switch actuating means to provide a signal thereto enabling its operation to permit the switch means to be in an "on" condition only when the battery voltage is above a predetermined reference value.

Preferably, the transceiver includes squelch means connected between the receiver and timer circuit, and it is adapted to limit the receiver output to signals having a predetermined signal strength whereby weak signals may be squelched. The battery voltage detection means includes a Zener diode providing a stabilized trigger voltage to a cutoff amplifier and a voltage divider providing a biasing voltage to the amplifier. Thus, the amplifier is actuated only when the trigger voltage is above the biasing voltage.

Desirably, the switch actuating means is an AND gate receiving signals from the battery voltage detection means and the timer circuit. The timer circuit includes a sleep timer providing a long duration "off" condition and signal and a short duration "on" condition and signal in which to determine if there is a signal on the receiver above a predetermined signal strength. A second timer is enabled by detection of a signal from the transmitter or the receiver to hold the sleep timer in an "on" condition during such signal and for a limited period thereafter. A flip flop circuit component is connected between the receiver and the timers.

In the preferred embodiment, the switch means is a pass transistor which is connected to the battery and to the switch actuating means to pass power to the receiver and transmitter upon receipt of a signal from the switch actuating means and from the timer circuit. The transceiver also includes a manual "on-off" switch. Desirably, there is included a visual indicator actuated by the battery voltage detection means, and means for overriding the battery voltage detection means to enable an emergency transmission.

In the method for operation of the novel transceiver, the transceiver is turned "on" to enable its operation, and power is periodically provided to the receiver and transmitter for intervals of relatively short duration. During these intervals, it is determined whether there is a signal being received on the receiver or being generated by the transmitter. If so, power continues to be supplied to the receiver and transmitter during the period in which such a signal continues and for a limited period of time thereafter. Concurrently, the voltage of the battery power supply is checked to determine whether it is above a predetermined voltage. If not, further power drain from the battery power supply is precluded.

Desirably, the power supply is interrupted for periods substantially greater than the duration of the short intervals, and generally the period of interruption is 7-15 times the length of the short intervals. Preferably, the transceiver includes a squelch circuit and the squelch circuit is adjusted to pass only signals above a selected strength for the step of determining whether there is a signal being received on the receiver.

DETAILED DESCRIPTION OF PREFERRED EMBODIMENT OF THE INVENTION

Figure 1:
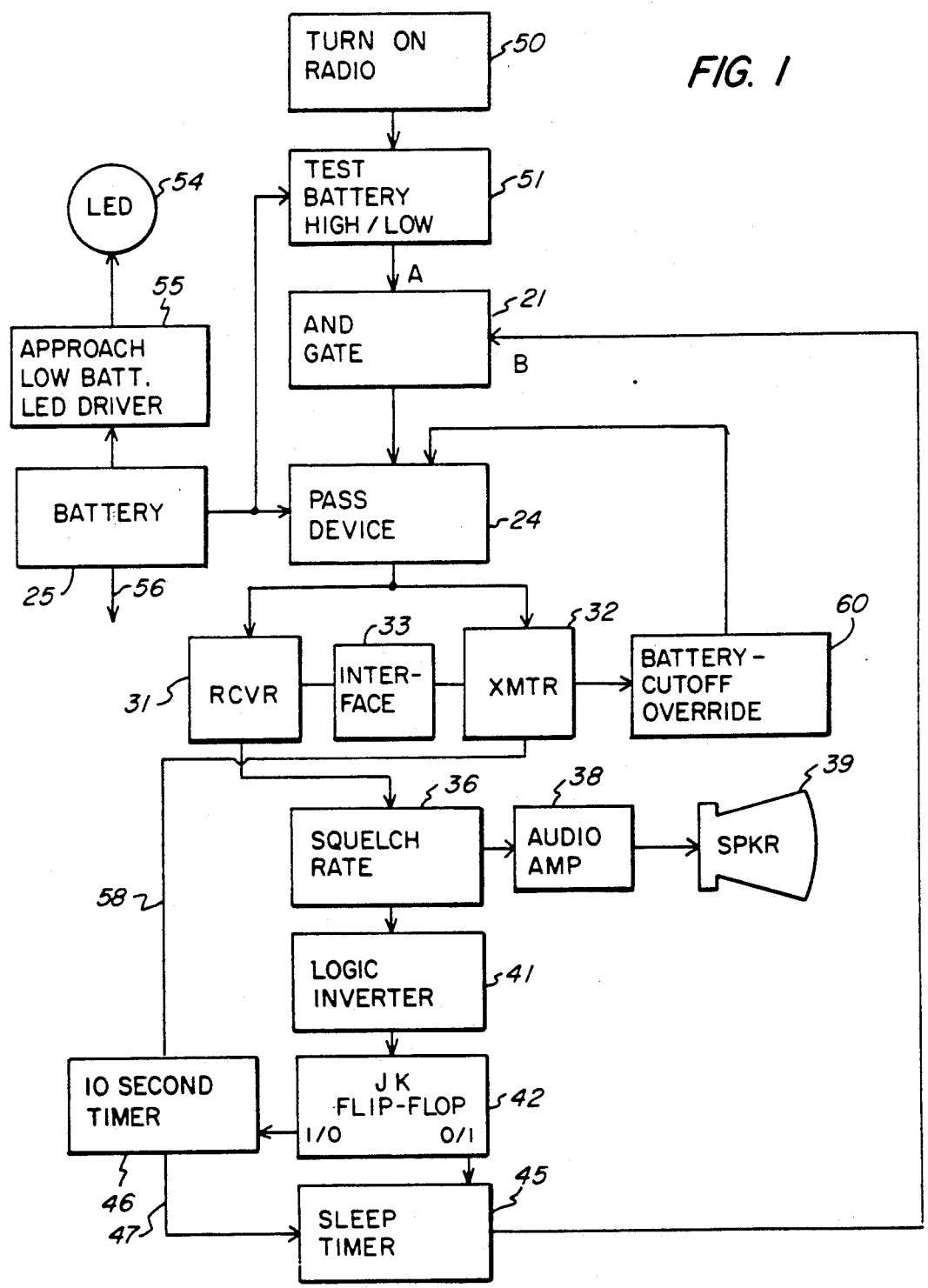
FIG. 1 is a functional diagram of a radiotelephone embodying the present invention and showing its subsystems and functions arranged in their functional sequence.

FIG. 1 illustrates the sequential operations of the major portions of the radiotelephone which are related to the present invention. Two systems are of central importance—a power conservation system and a battery saver system. These operate in conjunction with one another to achieve the objects of the invention.

The power conservation system takes advantage of the fact that much of the time there are no transmissions on any given channel within the primary reception area, usually 15-20 miles. It uses a timer to keep the receiver and transmitter in a dormant state almost 90 percent of the time, only "waking" them for brief, regular intervals to sample the monitored channel for any messages which are being broadcast, and readying the transmitter for possible use. This timer circuit is therefore referred to as having SLEEP and WAKE periods. When a message is received during a sampling interval, or if the transmitter is keyed, a second timer is started which overrides the SLEEP state of the first timer, WAKES the system, and keeps the power on for a period (conveniently 10 seconds), to complete the reception or transmission of the message. If the message is of a duration longer than 10 seconds, the process repeats so often as is necessary.

Referring in detail to FIG. 1, the radiotelephone is first turned on as seen in function 50. The battery 25 is tested by condition test circuitry shown by function 51 to determine if it is at level of charge which is HIGH, i.e., above a cutoff threshold, or LOW, i.e., below a cutoff threshold. If the latter is determined to be the case, then circuitry providing function 51 out puts a logical "0" signal to input port A of AND gate 21. This in turn causes gate 21 to output a logical "0" to pass device 24, blocking battery power from being supplied to the receiver 31 and the transmitter 32. The pass device 24 can comprise any of a number of components, including FETs, SCRs, operational amplifiers, optical relays, etc. In addition, when battery 25 is at or below a predetermined level which represents substantial discharge, a warning light emitting diode (LED) 54 or other indicator will be lit by LED driver 55 to alert the user of the need for recharging the battery.

However, if the battery 25 is determined to be at an acceptable level of charge, then the test circuit providing the function 51 outputs a logical "1" to the AND gate 21. However, the AND gate 21 cannot output a logical "1" to turn on pass device 24 unless it also receives a logical "1" at its second input port B. This logical "1" is provided at intervals by the output of the sleep timer 45, which is powered along with the squelch gate 36, the logic inverter 41, the JK flip-flop 42 and the 10-second timer 46, through power provided by the power lead 56 (connections are not shown).

Figure 2A:
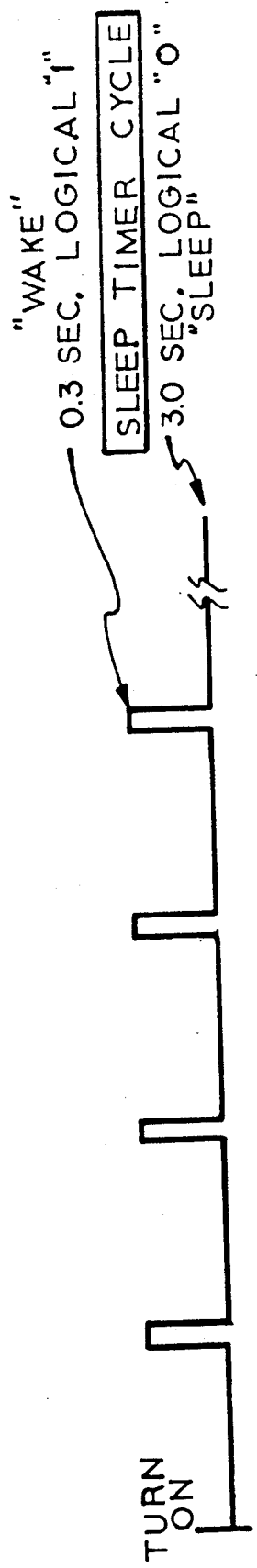
FIGS. 2A and 2B are signal-timing diagrams of the power conservation system.

The sleep timer cycle is illustrated in FIG. 2A. It outputs a logical "0" (SLEEP) for 3 seconds, followed by a logical "1" (WAKE) that lasts for 0.3 seconds, an OFF/ON ratio of 10:1. During the 0.3 second WAKE interval, the logical "1" from the sleep timer 45 is input to input port B of the AND gate 21, and it provides the second logical "1" needed for the gate 21 to output a logical "1" of its own to the pass device 24, so that it will pass battery current to the receiver 31 and the transmitter 32.

If the receiver 31 fails to receive a signal above the threshold of the squelch gate 36 during this interval, then the squelch gate 36 outputs a logical "0" which is inverted to a logical "1" by the logic inverter 41. This logical "1" output by the inverter 41 drives the JK flip-flop 42 to output a logical "1" from its right-side output port, restarting the sleep timer 45 for a further 3.3 second SLEEP/WAKE cycle.

However, if the receiver 31 receives during that interval a signal which exceeds the squelch threshold, then the squelch gate 36 outputs a logical "1". The logic inverter 41 inverts this logical "1" to a logical "0" which drives the JK flip-flop 42 to reverse its output signals. The result is that the sleep timer 45 now receives from the flip-flop 42 a logical input of "0", while the 10-second timer 46 now receives from the left-side output port of the flip-flop 42 a logical "1", and the latter turns on the 10-second timer 46. The output of the timer 46 is a "HOLD" signal on the signal line 47, and it controls the sleep timer 45 to hold its output state at a logical "1" level for 10 seconds, powering the receiver 31 and the transmitter 32, and permitting the detected message to be received. If the message is longer than 10 seconds, the sequence repeats for a further 10 seconds, and so on.

Figure 2B:
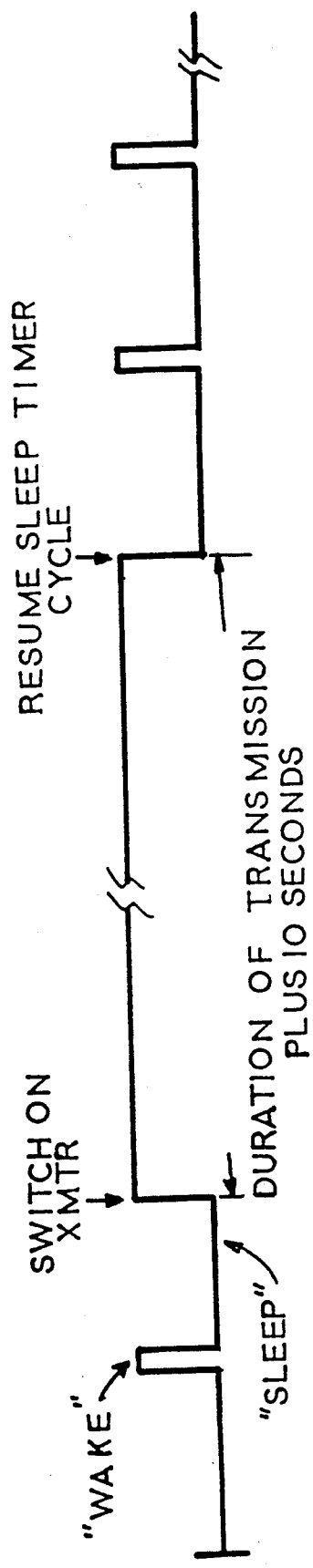

Whenever the user switches on the transmitter 32, the 10-second timer 46 receives a logical "1" signal through the signal lead 58. This starts the 10-second timer 46 and results in the sleep timer 45 being held at its logical "1" output state, so that both the transmitter and the receiver remain powered for so long as the ON switch (not shown) of the transmitter 32 is held closed. When the user releases that ON switch to end a transmission, the 10-second timer 46 remains on for 10 seconds longer, as though it had received a "start" trigger signal. Thus, the receiver 31 will, during that 10-second period, remain powered to receive any replies to the message just broadcast. FIG. 2B illustrates the timing involved.

Whenever the user holds the switch of the transmitter 32 in its ON position, the transmitter 32 is powered unconditionally, i.e., regardless of the battery's state of charge, overriding any battery cutoff which may have been effected by the battery saver function. This is accomplished by the battery cutoff override 60, which turns on the pass device 24. To conserve power in the event that "battery low" LED 54 is lit, indicating that the battery 25 is nearing a discharged state, the user may choose to switch the transmitter 32 from its NORMAL output power setting to its LOW output power setting, with a switch provided for that purpose. Neither this switch nor its associated control circuitry is shown here, since they are not essential to the present invention.

Figure 3:
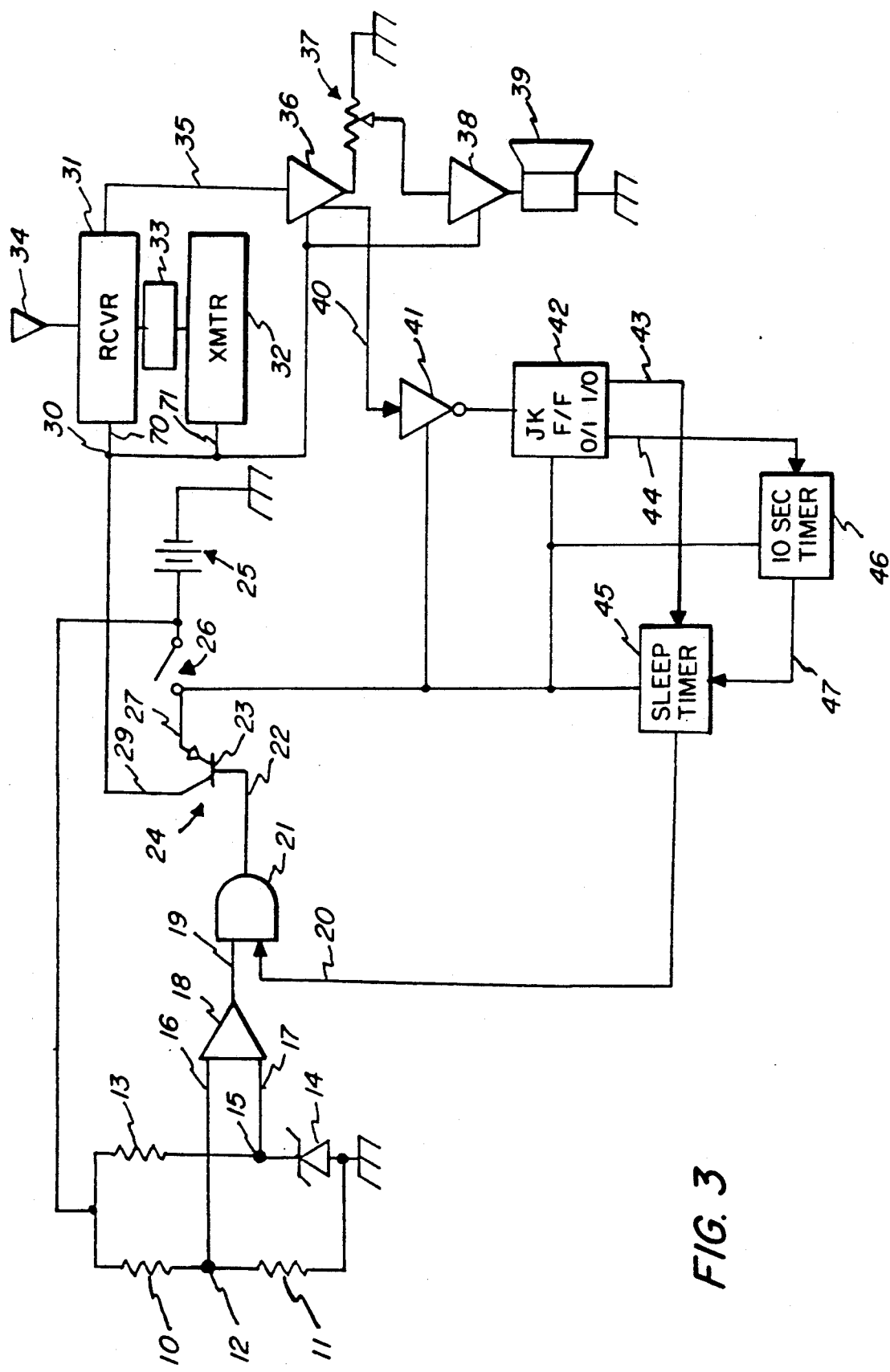
FIG. 3 is a schematic diagram of the basic elements of the radiotelephone circuit showing how the battery-saver function and the power-conservation function are combined.

FIG. 3 illustrates the basic circuitry of a typical embodiment of the present invention. Since many of its functional elements have already been described in detail in connection with FIG. 1, the following description will focus on those elements not previously described, commencing with the bridge network which compares the voltage of battery 25 with a reference voltage to determine the state of charge of the battery 25. The bridge comprises the resistors 10 and 11 forming a two-element voltage divider in which the battery voltage fed to the top of the resistor 10 produces a current flow through the resistor 10 and resistor 11 to ground. This establishes a bias voltage level at the junction 12 which can be compared with a stable reference voltage at the junction 15. The stable reference voltage at the junction 15 is established by the Zener diode 14, which draws current from the battery 25 through the current-limiting resistor 13. The Zener diode 14 is typically a device with a low temperature coefficient and which requires no auxiliary temperature compensation or stabilization over the entire range of ambient temperatures it will encounter in operation. These two voltages, i.e., the bias level at the junction 12 and the reference level at the junction 15, are fed to the differential amplifier 18 through the leads 16 and 17, respectively. So long as the bias voltage level is above a predetermined threshold, the differential amplifier 18 outputs a logical "1" into the signal lead 19, and thence to one of the input ports of the AND gate 21.

The other input port of the AND Gate 21 receives by the signal lead 20, logic signals output by the sleep timer 45. As previously described, whenever the sleep timer 45 outputs a WAKE signal, i.e., a signal at a logical "1" level, the AND gate 21 will in turn output a logical "1" into the signal lead 22, and thence to the base 23 of pass transistor 24, turning on the pass device 24. When the radiotelephone's power switch 26 is closed, battery power is provided through the emitter 27 to the collector output lead 29 to the junction 30. The junction 30 then provides battery voltage to the receiver 31 and to the transmitter 32 through the power leads 70 and 71, respectively.

If the battery 25 has a terminal voltage which is below the predetermined cutoff point, then the amplifier 18 will output a logical "0" which, when fed to the AND gate 21 through the signal lead 19, will cause the AND gate 21 to output a logical "0" regardless of the state of input of the sleep timer 45 to the signal lead 20. This will cut off power to the receiver 31 and the transmitter 32, saving the battery 25 from further possibly damaging discharge, unless the battery-saver function is overridden by the user's effecting an emergency transmission despite the low battery charge.

As shown the receiver 31 and the transmitter 32 share the antenna 34, and the interface 33 between them is to mute the receiver 31 during transmission. The potentiometer 37 is the volume control for audio amplifier 38 and speaker 39. The receiver 31 drives the squelch gate 36 through the signal lead 35. Not shown is a conventional squelch threshold control by which the signal strength of an incoming signal can be measured and the output of the squelch gate 36 limited thereby. As described earlier, the logical output of the squelch gate 36 drives the logic inverter 41, which in turn drives the JK flip-flop 42, and thereby the sleep timer 45 and the 10-second timer 46 through the signal leads 43 and 44 respectively.

It will be appreciated that the circuit components may vary from those illustrated. A more complex battery voltage comparator device may be employed to monitor voltage against a standard reference. The pass device is conveniently a pass transistor although a power FET, operational amplifer or optical coupler/relay, and like devices serves as a "switch" actuated by the AND gate may also be employed. Similarly, other electronic components may be substituted for the illustrated AND gate.

It will be appreciated that the described embodiments are merely illustrative of the principles involved, and that many alternative configurations can be readily devised by persons skilled in the art without departing from the spirit of these illustrative examples or from the principles disclosed in the present invention. For example, the selection of a low output power setting, when overriding a battery-saver cutoff in order to transmit, could be done automatically; several stable reference thresholds could be established for the battery condition, rather than just one, with specific user alerts or functional restrictions at each such threshold; the sleep timer could be designed to output different SLEEP and WAKE gate lengths, for example 2.7 seconds and 0.35 seconds, respectively; and the 10-second timer could be designed to operate for a period that is shorter or longer than 10 seconds, and so forth.

By having the squelch control circuit adjusted to limit reception of signals to those with sufficient signal strength to be of interest, the output to the timers can be limited to reduce actuation of the 10-second timer. The sleep timer limits the demand for power by the receiver and transmitter to its short wake times, and, as a result, power consumption is reduced. The battery condition monitoring circuit concurrently functions to disable the unit from constant functioning when the battery has reached a predetermined discharge level, at which point it can be overridden for an emergency use.

Thus, it can be seen from the foregoing detailed specification and attached drawings that the battery powered transceiver of the present invention has novel battery saving functions which are provided by relatively inexpensive and reliable components.

Having thus described the invention, what is claimed is:

1. In a transceiver, the combination comprising:
   (a) a battery;
   (b) a transmitter;
   (c) a receiver;
   (d) switch means connected between said battery and said transmitter and receiver;
   (e) switch actuating means operative to operate said switch means between "on" and "off" condition;
   (f) circuit means connecting said battery to said transmitter and receiver through said switch means; and
   (g) a timer circuit connected to said receiver and transmitter and operative to transmit an actuation signal to said switch actuating means upon receipt on said receiver of a signal or during operation of said transmitter and to disable said switch actuating means and thereby maintain said switch means in an "off" condition during other periods to cut of power supply to said receiver and transmitter, said disabling being periodically interrupted for short intervals to provide power to said receiver and transmitter for such short intervals, said timer circuit enabling continued power supply through said switch means if an enabling signal is received by said receiver or said transmitter is operated a said timer circuit including timing means providing three timing periods comprising a sleep timer circuit having two timing periods, comprising (i) a relatively long duration "off" period in which said switch actuation means is disabled, (ii) a relatively short duration "on" period in which an actuation signal is provided to said switch actuation means to monitor said receiver to determine the existence of a signal to enable continued power supply, and a second timer having a third timing period comprising (iii) a relatively long "standby" period following termination of a transmission on said transmitter for receipt of a response on said receiver.

2. The transceiver in accordance with claim 1 including battery voltage detection means connected to said switch actuating means to provide a signal thereto enabling its operation to permit said switch means to be in an "on" condition only when the battery voltage is above a predetermined reference value.

3. The transceiver in accordance with claim 2 wherein said transceiver includes a squelch means connected between said receiver and sleep timer circuit and adapted to limit the receiver output to signals having a predetermined signal strength whereby weak signals may be squelched.

4. The transceiver in accordance with claim 2 wherein said battery voltage detection means includes a Zener diode providing a stabilized trigger voltage to a cutoff amplifier and a voltage divider providing a biasing voltage to said amplifier, said amplifier being actuated only when said trigger voltage is above said biasing voltage.

5. The transceiver in accordance with claim 1 wherein said switch actuating means is an AND gate receiving signals from said battery voltage detection means and said timer circuit.

6. The transceiver in accordance with claim 1 wherein said timer circuit includes a flip flop circuit component connected between said receiver and said timing means.

7. The transceiver in accordance with claim 1 wherein said switch means is a pass transistor which is connected to said battery and to said switch actuating means to pass power to said receiver and transmitter upon receipt of a signal from said switch actuating means.

8. The transceiver in accordance with claim 1 wherein said transceiver also includes a manual "on-off" switch.

9. The transceiver in accordance with claim 2 wherein there is included a visual indicator actuated by said battery voltage detection means.

10. The transceiver in accordance with claim 2 wherein there is included means for overriding said battery voltage detection means.

11. In a transceiver, the combination comprising:
    (a) a battery;
    (b) a transmitter;
    (c) a receiver;
    (d) switch means connected between said battery and said transmitter and receiver;
    (e) switch actuating means operative to operate said switch means between "on" and "off" condition;
    (f) circuit means connecting said battery to said transmitter and receiver through said switch means;
    (g) a timer circuit connected to said receiver and operative to transmit an actuation signal to said switch actuating means upon receipt of a signal or during operation of said transmitter and to disable said switch actuating means and thereby maintain said switch means in an "off" condition during other periods, to cut off power supply to said receiver and transmitter, said disabling being periodically interrupted for short intervals to provide power to said receiver and transmitter for such short intervals and to enable continued operation if an enabling signal is received by said receiver or said transmitter is operated, said timer circuit including timing means providing three timing periods comprising a sleep timer circuit having two timing periods, comprising (i) a relatively long duration "off" period in which said switch actuation means is disabled, (ii) a relatively short duration "on" period in which an actuation signal is provided to said switch actuation means to monitor said receiver to determine the existence of a signal to enable continued power supply, and a second timer having a third timing period comprising (iii) a relatively long "standby" period following termination of a transmission on said transmitter for receipt of a response on said receiver;

(h) squelch means connected between said receiver and sleep timer circuit and adapted to limit the receiver output to signals having a predetermined signal strength whereby weak signals may be squelched; and (i) battery voltage detection means connected to said switch actuating means to provide a signal thereto enabling its operation to actuate said switch means into an "on" condition only when the battery voltage is above a predetermined reference value.

12. The transceiver in accordance with claim 11 wherein said battery voltage detection means includes a Zener diode providing a stabilized trigger voltage to a cutoff amplifier and a voltage divider providing a biasing voltage to said amplifier, said amplifier being actuated only when said trigger voltage is above said biasing voltage.

13. The transceiver in accordance with claim 11 wherein said switch actuating means is an AND gate receiving signals from said battery voltage detection means and said timer circuit.

14. The transceiver in accordance with claim 11 wherein said switch means is a pass transistor which is connected to said battery and to said switch actuating means to pass power to said receiver and transmitter upon receipt of a signal from said switch actuating means.

15. In a method for operation of a transceiver having a rechargeable battery power supply, a receiver and a transmitter, the steps comprising:

(a) turning the transceiver "on" to enable operation;

(b) periodically providing power to the receiver and transmitter for intervals of relatively short duration;

(c) determining whether, during said intervals, there is a signal being received on said receiver or being generated by said transmitter and, if so, continuing to supply power to said receiver and transmitter during the period in which such a signal continues and for a limited period of time after termination of a transmission on said transmitter for receipt of a response on said receiver; and (d) determining whether the voltage of the battery power supply is above a predetermined voltage and, if not, disabling further power drain from said battery power supply.

16. The method of operating a transceiver in accordance with claim 15 wherein said step of periodically providing power, interrupts the power supply for periods substantially greater than the duration of said short intervals.

17. The method of operating a transceiver in accordance with claim 15 wherein the period of interruption is 7-15 times the length of said short intervals.

18. The method of operating a transceiver in accordance with claim 15 wherein the transceiver includes a squelch circuit and said squelch circuit is adjusted to pass only signals above a selected strength for the step of determining whether there is a signal being received on said receiver.

19. The method of operating a transceiver in accordance with claim 15 wherein step (d) is conducted concurrently with step (c).

* * * * *

UNITED STATES PATENT AND TRADEMARK OFFICE
CERTIFICATE OF CORRECTION

PATENT NO. : 5,095,308
DATED : March 10, 1992
INVENTOR(S) : Robert M. Hewitt It is certified that error appears in the above-identified patent and that said Letters Patent is hereby corrected as shown below:

Column 7, line 57, "of" should be "off".

Signed and Sealed this

Thirty-first Day of August, 1993

*Attest:*

BRUCE LEHMAN

*Attesting Officer*     Commissioner of Patents and Trademarks